No. 760,953. PATENTED MAY 24, 1904.
O. P. BUCKLAND.
FASTENING FOR SECTIONAL TUBING.
APPLICATION FILED SEPT. 19, 1903.
NO MODEL.
Fig. 1,
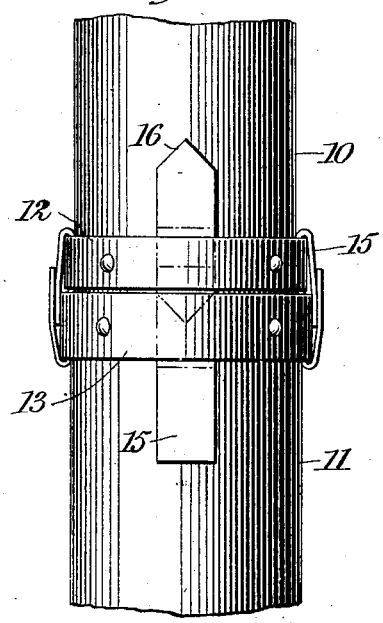
Fig. 2,
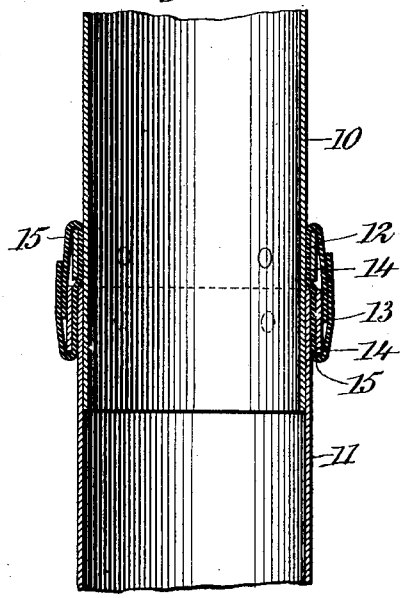
Fig. 3,
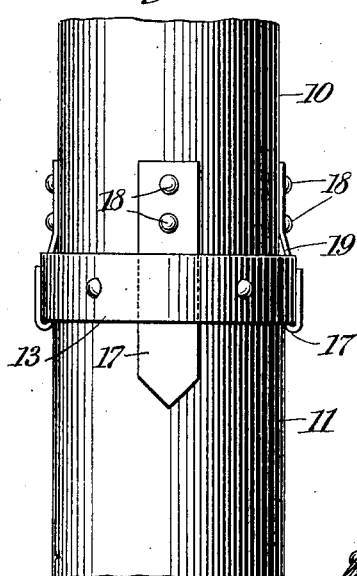
Fig. 4,
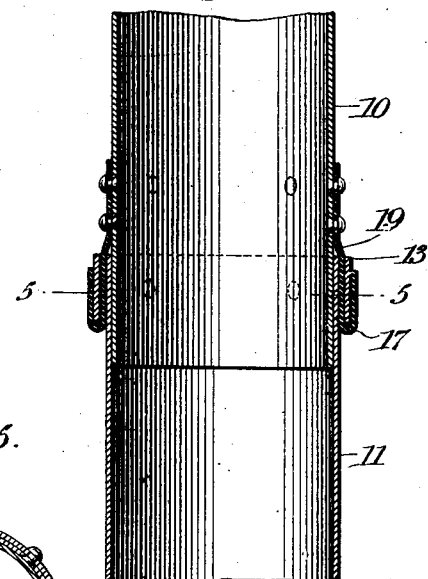
Fig. 5.
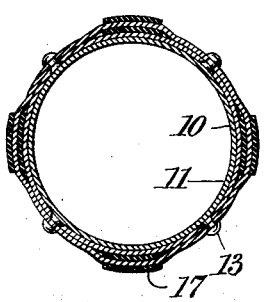
WITNESSES:
Edward Thorpe.
C. R. Ferguson
INVENTOR
Orson P. Buckland
BY
Munn
ATTORNEYS
THE NORRIS PETERS CO., PHOTO-LITHO., WASHINGTON, D. C.

No. 760,953. Patented May 24, 1904.

UNITED STATES PATENT OFFICE.

ORSON P. BUCKLAND, OF LIBERAL, KANSAS, ASSIGNOR OF ONE-HALF TO B. E. BLAKE & SON, OF LIBERAL, KANSAS.

FASTENING FOR SECTIONAL TUBING.

SPECIFICATION forming part of Letters Patent No. 760,953, dated May 24, 1904.

Application filed September 19, 1903. Serial No. 173,905. (No model.)

*To all whom it may concern:*

Be it known that I, ORSON PRATT BUCKLAND, a citizen of the United States, and a resident of Liberal, in the county of Seward and State of Kansas, have invented a new and Improved Fastening for Sectional Tubing, of which the following is a full, clear, and exact description.

This invention relates to improvements in fastenings for the sections of tubing—such as well-casings, conductor-pipes, and the like—an object being to provide a fastening of simple construction and which will give strength to the joints between sections and prevent collapsing or telescoping under pressure.

I will describe a fastening for sectional tubing embodying my invention and then point out the novel features in the appended claims.

Reference is to be had to the accompanying drawings, forming a part of this specification, in which similar characters of reference indicate corresponding parts in all the figures.

Figure 1 is a side elevation of two sections of tubing or casing with a fastening embodying my invention applied thereto. Fig. 2 is a longitudinal section thereof. Fig. 3 is a side view showing a modification. Fig. 4 is a longitudinal section thereof, and Fig. 5 is a section on the line 5 5 of Fig. 4.

Referring first to the example of my improvement shown in Figs. 1 and 2, 10 and 11 indicate two tubing or casing sections telescoped at the ends one into the other. Secured to the upper section 10 near its end is a metal band or ring 12, and a similar ring or band 13 is attached to the end of the lower section 11. Each ring or band is provided between its rivet-fastenings with loops or pockets 14, through which the fastening devices are designed to pass. The fastening devices, as here shown, consist of metal plates 15, pointed at one end, as indicated at 16. By pointing the ends of the plates they are more readily inserted through the loops or pockets.

In operation when two sections of tubing or casing are placed together the fastening devices are to be passed through the loops or pockets and then turned over the rings or bands, preferably with the pointed ends at the inner side, so as to prevent the fastening devices from catching into the earth or other material when the connected sections are moved downward.

In Figs. 3 and 4 I have shown the lower section 11 as provided with a ring or band 13 similar to that first described, and in this instance plates 17 are secured, by means of rivets 18, to the upper section. The pointed ends of the plates after the sections of tubing shall have been placed together are to be passed through the pockets or loops and then turned upward against the outer side of the ring or band.

It will be noted that in each instance the fastening-plates have inwardly-extended shoulder portions or bends 19, which will engage against the upper end of the lower section, thus preventing any possible telescoping of the tube-sections.

Having thus described my invention, I claim as new and desire to secure by Letters Patent—

1. A fastening for tubing-sections, comprising a ring secured to one of the sections and having loop or pocket sections, and fastening-plates having connection with the other of said tubing-sections and adapted to pass through said loops or pockets and to bend over the outer surface of the ring the said fastening-plates having shoulder portions for the purpose described.

2. A fastening for tubing-sections, comprising rings secured to the connecting ends of the sections, the said rings being provided with loop portions, and fastening-plates adapted to pass through alined loop portions of the rings, the said plates having shoulder portions for engaging over the end of one of said tube-sections.

In testimony whereof I have signed my name to this specification in the presence of two subscribing witnesses.

ORSON P. BUCKLAND.

Witnesses:
C. E. WOODS,
A. E. BLAKE.